Oct. 12, 1943.  S. SCHIFF  2,331,510
KNEADING AND ROUNDING MACHINE
Filed March 19, 1942  2 Sheets-Sheet 1
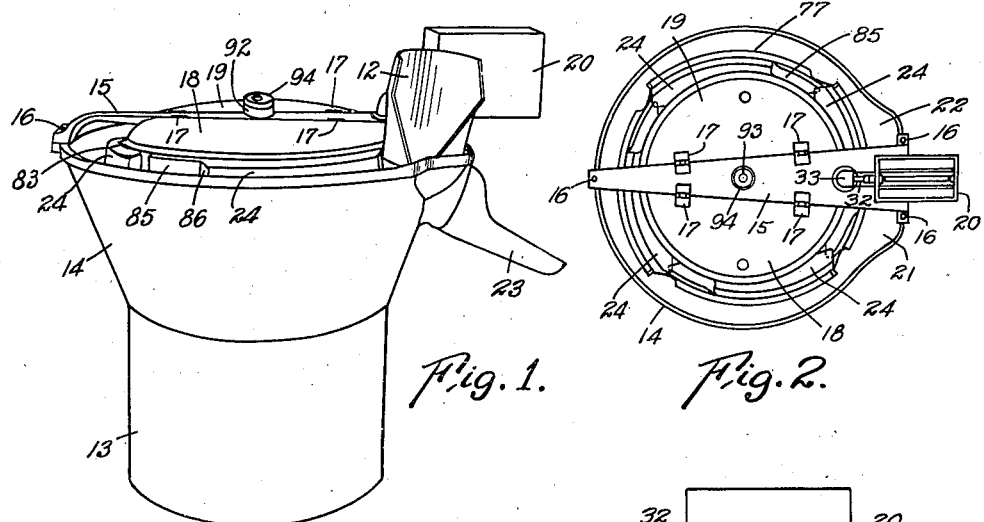
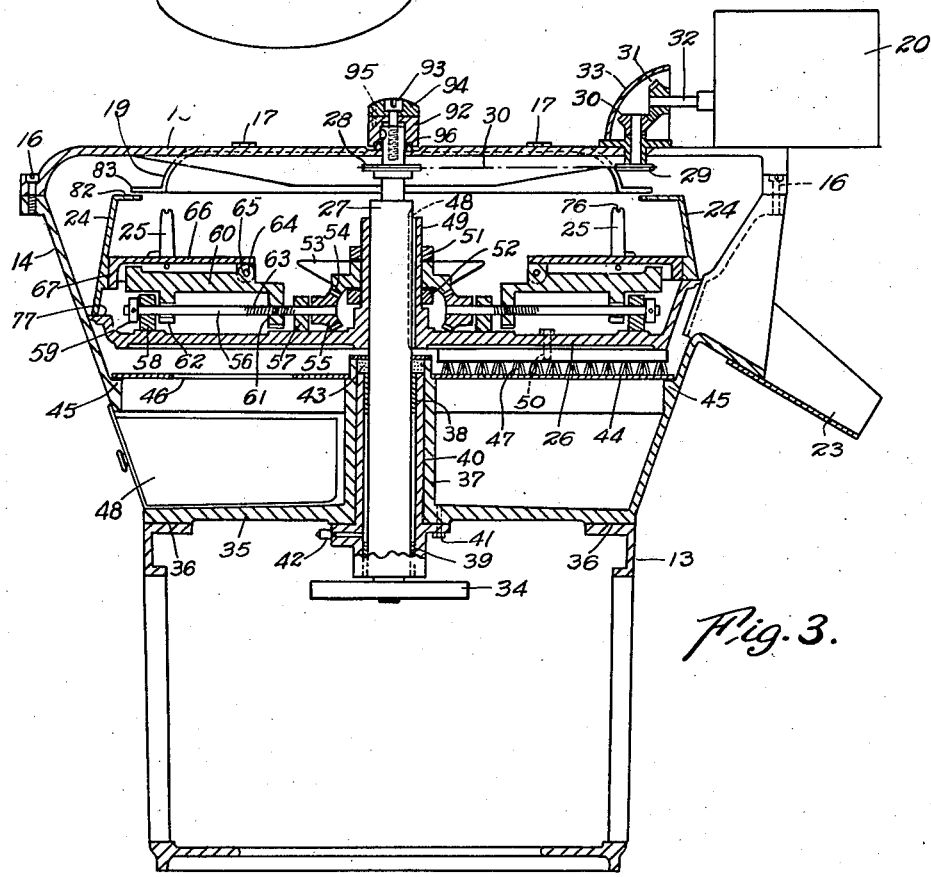
INVENTOR
Sigmund Schiff
BY
Zugelter, Kinney & Zugelter
ATTORNEYS Oct. 12, 1943.  S. SCHIFF  2,331,510
KNEADING AND ROUNDING MACHINE
Filed March 19, 1942   2 Sheets-Sheet 2
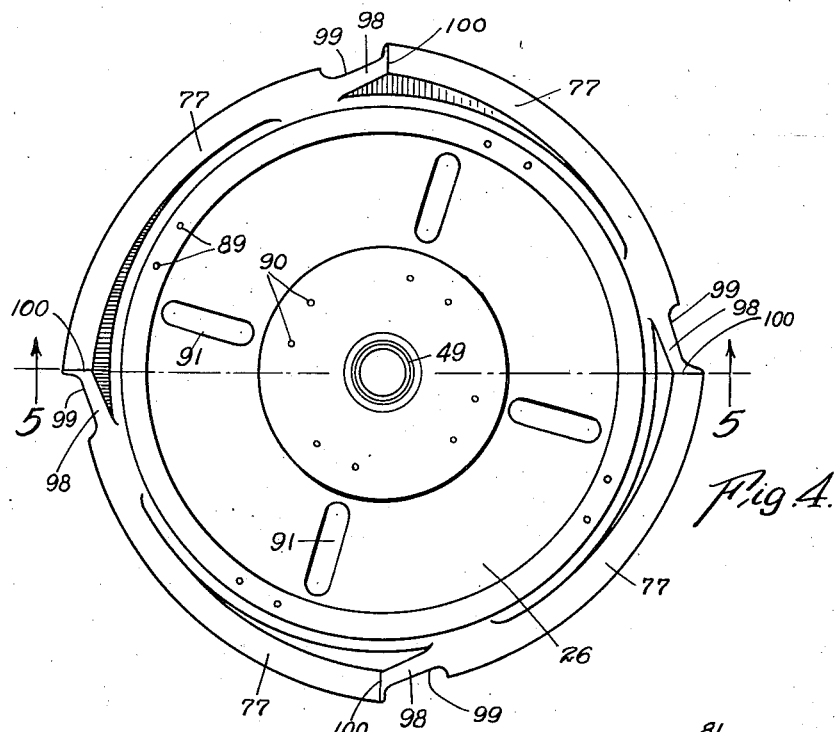
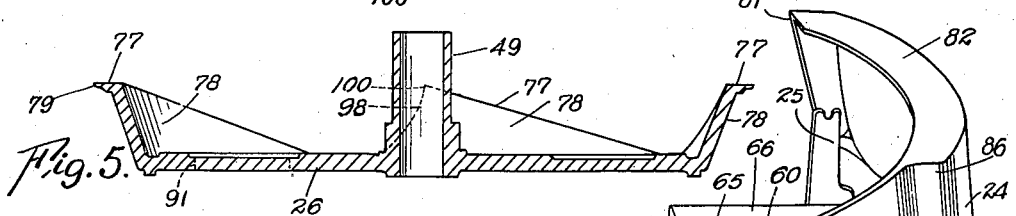
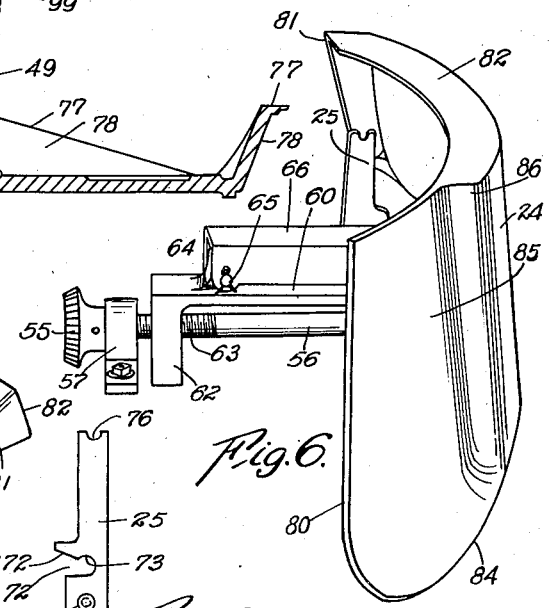
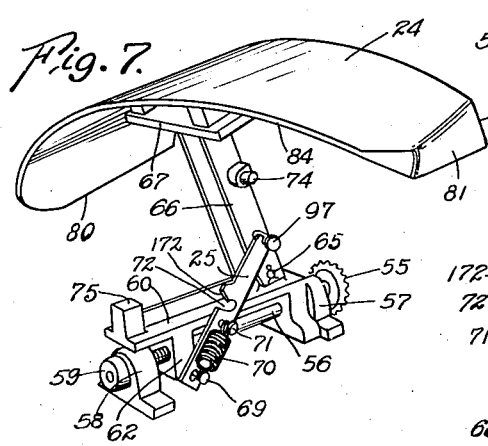
INVENTOR
Sigmund Schiff
BY Zugelter, Kinney & Zugelter
ATTORNEYS Patented Oct. 12, 1943

2,331,510

UNITED STATES PATENT OFFICE 2,331,510

KNEADING AND ROUNDING MACHINE

Sigmund Schiff, Cincinnati, Ohio, assignor to The J. H. Day Company, Cincinnati, Ohio, a corporation of Ohio Application March 19, 1942, Serial No. 435,363

34 Claims. (Cl. 107—9)

This invention relates to a machine for kneading and rounding individual masses of plastic substance such as dough or the like, and is of the type having a stationary outer cone within which the kneading plates travel bodily about a central axis in kneading and rounding relationship to an inner working surface of the cone.

Among the advantages and objects of the invention are the provision of means in a machine of the character stated, for achieving extreme simplification of construction, increased durability and efficiency, practical elimination of dough scrap without the use of flour during kneading and rounding, and an increase of the kneading action performed upon individual masses as they complete a single passage through the machine.

Another object of the invention is to provide in a machine of the character stated, a common adjusting means whereby all kneading plates may be moved unitarily to various positions of adjustment relative to the cone, for quickly adapting the machine to the kneading and rounding of various sizes and types of dough lumps.

A further object is to incorporate in such a machine, structure conducive to immediate starting of the individual dough lumps along the path of kneading and rounding, the instant the lumps enter the machine. This instantaneous starting of the lumps avoids the formation of doubles, and imparts to the lumps a maximum kneading and rounding action while traveling along the full course of the working surfaces of the machine. Auxiliary lump starting mechanisms are not necessary in the machine of this invention.

Another object of the invention is to provide a rounder of the class described, incorporating simple and durable means to compensate for wear at the working areas where close limits of adjustment may be achieved to practically eliminate the formation of scrap.

Other objects are: to provide for easy cleaning of the machine; to expedite servicing and preparation of the machine for usage; to eliminate the need for the use of flour during the kneading and rounding operation; to provide for the safety of the operator of the machine during use thereof; and to furnish a novel and simple form of drive for a duster operating to flour the lumps as they leave the machine possessed of an over-all tender skin retaining the gases of fermentation within the lumps.

The foregoing and other objects are attained by the means described herein and disclosed in the accompanying drawings, in which:

Fig. 1 is a general view of the machine, in perspective.

Fig. 2 is a top plan view of the machine, with the guide or chute element 12 omitted.

Fig. 3 is a vertical cross-sectional view of the machine as illustrated by Fig. 1.

Fig. 4 is a top plan view of a rotary kneading wheel that carries the several kneading plates.

Fig. 5 is a cross-sectional view of the kneading wheel, taken on line 5—5 of Fig. 4.

Fig. 6 is a perspective view of a kneading plate, and its associated hinged support, the kneading plate being shown in the operative position.

Fig. 7 is a perspective view of the mechanism illustrated by Fig. 6, showing the kneading plate tilted to the inoperative position at which it may be cleaned and/or coated, when necessary or desirable.

Fig. 8 is a detailed view, in plan, showing a locking lever utilized for maintaining the kneading plate in either of the positions illustrated by Figs. 6 and 7.

Referring to the general views, Figs. 1 and 2, 13 indicates a stationary hollow base for the machine, upon which is fixedly supported a one-piece cone or pot 14 having its annular wall flared upwardly and outwardly from the top of the base. Spanning the cone is a bridge piece 15, which is fixed to the upper annular edge of the cone at the locations 16—16—16. The bridge piece is provided with hinges 17 that permit swinging of the lids or covers 18 and 19 whereby access may be had to the interior of the machine. The flour duster shown generally at 20, preferably is supported in any suitable manner to overhang one end of the bridge piece, where the dough lumps emerge from the machine after having been kneaded and formed into a ball. The chute or guide 12, which directs dough lumps to the machine, is omitted from Figs. 2 and 3 in the interest of clarity of disclosure. Said chute or guide would occupy the position indicated at 21 of Fig. 2.

The location 21 constitutes the entry port, while the exit port or station is indicated at 22. A chute 23 (Fig. 1) may be furnished at the exit port, to direct the kneaded and formed lumps to a conveyor or receptacle of any suitable type, preparatory to subjecting the dough lumps to a subsequent operation.

Upon all of the drawing views, the kneading plates that rotate with the kneading wheel, are indicated by the character 24, and it will be noted that in the present embodiment there are four such kneading plates. The number of kneading plates may be increased or decreased, depending upon the capacity or the work expected from the machine. Arrangements are made within the area covered by the lids 18 and 19, for supporting the several kneading plates upon the kneading wheel, in such manner that the plates may be unitarily advanced and retracted radially relative to the inner working surface of the cone, and for tilting the kneading plates as illustrated by Fig. 7 so that when a lid is lifted the kneading plates may be exposed to full view for cleaning or coating them with paraffin or other substance in aid of the kneading and rounding operation. A latch mechanism, later to be described in detail, but indicated generally by the character 25, serves to either lock the kneading plate in the operative position of Fig. 6, or to support it in the tilted condition of Fig. 7.

Another general observation is that the kneading wheel 26 is suspended bodily from the bridge piece 15, with the use of adjusting means whereby said wheel may be lifted and lowered vertically within the cone to secure practically a running fit between the inner surface of the cone and the outer periphery of the kneading wheel. Moreover, the shaft 27 that supports the kneading wheel carries near its upper end a driving means for operating the duster 20, which driving means may conveniently consist of a sprocket 28 fast on the shaft and arranged to drive a second sprocket 29 through the medium of a chain 30, from which second sprocket the transmission of power to the duster may be effected by means of the bevel gears 30 and 31. The specific construction of the duster is a matter immaterial to the present invention, although it may be said that the duster should include a main shaft 32 to be rotated by the gears 30 and 31 driven from the main sprocket 28 as previously indicated. The character 33 indicates a hood fixed upon the bridge piece 15 in protective relationship to the bevel gears that drive the duster. As will be understood, the duster overhangs the discharge chute 23, and is mounted stationarily upon the bridge piece 15.

The main central shaft 27 of the machine has at its lower end a wheel 34, which may be considered the prime mover serving to drive the kneading wheel and other moving parts of the machine. The wheel 34 may be in the form of a pulley or a sprocket, to which power will be applied preferably by means of a motor located within the base 13.

The foregoing general description should afford a basic understanding of the machine and its mode of operation, so that the detailed description which follows may readily be understood.

The cone 14 has a bottom 35 adapted for fixation to the top portion of the base at the locations 36, and from said bottom 35 there is upwardly extended a central tube 37 adapted to house the bearings of the main shaft 27. Such bearings are indicated at 38 and 39, and these are contained within a sleeve 40 which may be fixed as at 41 to the bottom of the cone. An oiler for the bearings is indicated at 42.

The upper end of the sleeve preferably is capped with a packing gland indicated at 43, over which a disc is placed as shown for the purpose of retaining a lubricant within the bearing space about the main shaft. A circular disc 44 rests upon a portion of the unstanding tube 37, and also upon an annular ledge 45 of the cone, said disc serving to divide the cone into upper and lower compartments. At one location, the disc has an elongated opening 46 through which sweepings accumulated by a brush 47 or other form of accumulator, may be directed into a scrap box 48 located beneath the opening 46. The scrap box may be in the form of a drawer which may be slid out of the lower compartment whenever it is necessary to empty it of its contents. As will be understood, the disc 44 is stationary, so that the opening 46 will be always directly above the scrap box.

The kneading wheel 26 preferably is keyed to the main shaft 27, as indicated at 43, it being understood that the kneading wheel has an upstanding central hub 49 for this purpose. The accumulator 47 is attached to the underface of the kneading wheel, and is so arranged as to lightly transverse the dividing disc 44. A bolt 50 may be employed for suspending the accumulator or brush 47 from the kneading wheel.

The hub 49 of the kneading wheel carries a pair of fixed collars 51 and 52 spaced apart to retain between them a star wheel or any form of handwheel 53, to which access may be had by lifting one or the other of the lids or covers 18—19. The star wheel or handwheel may be properly considered an adjusting element, as its function is that of radially extending and retracting the several kneading plates relative to the inner working face of the cone. It will be observed that the adjusting member or wheel 53 carries a gear 54, which preferably is a miter gear made integrally therewith, the teeth of which gear are adapted to mesh with the teeth of four miter pinions 55 fixed to the inner ends of the four radially extended adjusting screw shafts 56 associated with each of the four kneading plates. These screw shafts are supported for rotation in bearings 57 and 58 fixed upon the upper face of the kneading wheel.

At this point in the description, it may be stated that the four screw shafts, their bearings, and their association with the adjusting wheel and the kneading plates, are identical in all respects so that a description of one will suffice for the others also.

The description up to this point should render clearly evident the fact that when the machine is at rest, the operator may lift one of the lids 18 or 19, reach inside the upper compartment, and grasp the handwheel 53, and by rotating the handwheel effect simultaneous rotation of the four screw shafts 56 in a common direction, due to the fact that the inner pinions of the shafts are all in constant mesh with the gear 54 that constitutes an integral part of the handwheel. It will, of course, be understood that the fixed collars 51 and 52 are sufficiently spaced to permit free rotation of the handwheel relative to the main shaft 27 and the kneading wheel hub 49 that surrounds it. It will therefore be evident that proper mechanism associated with each kneading plate may be mechanically connected with each screw shaft, to effect bodily radial adjustment of all kneading plates in unison toward and from the inner working face of the cone.

The drawings illustrate a satisfactory form of means associated with the screw shafts for achieving the kneading plate adjustment referred to. As previously stated, the screw shafts 56 are supported for rotation by the fixed bearings 57 and 58, and each may carry a collar 59 at its outer end to prevent lengthwise shifting movement. A saddle 60 is adapted to support the kneading plate, and this saddle may comprise a downwardly directed leg 61 bored and tapped with threads suitable to engage the threads of the screw shaft. A second leg 62 depending from the saddle, loosely surrounds the shaft at a point remote from the threads 63, so that rotation of the shaft 56 may shift the saddle inwardly and outwardly in a horizontal plane, without liability of the saddle to rotate or to move out of parallelism with the shaft axis. The lower end of saddle leg 61 nearly reaches the upper face of the kneading wheel, so that only a very slight rocking movement of the saddle may occur axially of its associated screw shaft. This slight rocking movement, while very limited, is considered a desirable feature for the reason that it permits self-adjustment of the kneading plate to the kneading wheel where the plate rests upon the wheel, as will be more fully explained hereinafter.

A boss 64 upon the saddle, located near the inner depending leg 61, carries a pivot 65 for pivotally supporting the kneading plate arm 66 upon the saddle for upward swinging movement in a vertical plane, as is most clearly illustrated by Fig. 7. This arm has a head 67 to which is fixedly attached the kneading plate, the attachment being effected by means of welding, screws, or other fastening devices. When a lid such as 18 is lifted so as to provide an opening in the top of the machine, any kneading plate that may be in registry with the opening may be lifted to an exposed position, by first unlatching the arm 66 and then elevating it about the pivot 65, while the saddle 60 remains in place and maintains the adjusted relationship of the kneading plate to the cone, so that the kneading plate when subsequently lowered to the operating position will automatically assume a proper spaced relationship to the working face of the cone.

In order that the kneading plate may not be displaced during operation of the machine, suitable holding means may be furnished and for an example of such holding means reference may be made to Figs. 7 and 8. Said holding means may comprise a lever 25 having formed in its lower end an elongated aperture 68, which is adapted to accommodate a fixed pin 69 extending outwardly from the outermost leg 62 of the saddle. The pin 69 is of sufficient length to provide an anchorage for one end of a spring 70, the other end of which is anchored to another pin 71 fixed upon the lever.

At a location intermediate the upper and lower ends of lever 25, an open mouthed slot 72 is formed, leading inwardly from an edge of the lever, and at the base of the slot there is formed a notch 73 adapted to accommodate an extending pin 74 fixed to and extending from the side of the lever 66. As may be observed by referring to Fig. 7, lever 66 may be in the form of an inverted channel, in order that the opposed legs of the channel may embrace an upstanding block 75 at the outer end of the saddle. When the kneading plate is lowered to the Fig. 6 position, the block 75 will center the lever 66, due to the embracing function of the lever sides, thereby to prevent any tendency of lever 66 to shift laterally of the saddle and possibly injure the hinge connection at 65.

With further reference to the lever 25, it should be noted that the act of swinging the lever into engagement with the extending pin 74, when the kneading plate is lowered to operative position, will bring an inclined edge 172 of the slot 72 into engagement with the pin 74, causing a slight elevation of the lever bodily relative to the pivot or pin 69, in opposition to the force of spring 70, so that the pin 74 upon entering fully into the slot will be yieldingly held in engagement with the notch 73 of slot 72. The lever so engaged with the pin 74, with spring 70 tensioned, may not accidently be displaced during operation of the machine.

The upper end of lever 25 is notched as at 76, so as to accommodate an extending pin or abutment 97 of lever 66, so located between the pivot 65 and pin 74 as to maintain an elevated condition of the kneading plate when the lever 25 is placed in endwise abutment with part 97 in accordance with the Fig. 7 disclosure.

The kneading plates 24 are made to fit edgewise upon the wide upper faces 77 of the spiral inclines 78 of the kneading wheel, the inclines corresponding in number with the number of kneading plates. The outer edges of the spiral inclines are feathered or reduced in thickness, as at 79, where they clear the working inner surface of the cone by a few thousandths of an inch, producing in effect substantially a running fit. At the terminal drop walls 98 of the inclines, recesses 99 may be formed so as to provide a space at each pocket through which may drop any small dough particles or scales that may ascend the inclines as the dough lumps advance. Said recesses form spaces at the pockets, between the wheel and the cone. Any droppings from the terminal edges 100 of the inclines will thereby fall onto the disc 44, and be swept into the scrap box.

The lower longitudinal edges 84 of the kneading plates are nicely fitted to the upper shelf faces 77 of the kneading wheel inclines, and said faces 77 are so shaped that a nice and close fit will ensue in all radially adjusted positions of the plates. That is to say, referring to Fig. 3, the lower edge of kneading plate 24 will bear uniformly upon the shelf face 77 of the kneading wheel incline, whether the kneading plate be advanced radially toward the working inner face of the cone, or retracted some distance from it, depending upon the direction in which the adjusting wheel 53 is rotated for making an adjustment to accommodate the machine to various sizes, weights, or kinds of dough lumps. The range of radial adjustment of the kneading plates preferably is sufficient to accommodate the machine to the handling of dough lumps from small roll or bun size, up to the larger bread loaf sizes. The size of lump to be rounded and kneaded determines the spacing of the kneading plates from the cone.

Due to the fact that the kneading plates rest upon the inclined shelf faces of the kneading wheel and are substantially coextensive with the length of said faces, the plates are made progressively narrower in width from their leading ends 80 to their trailing ends 81, in order that the flanged upper edges 82 (Fig. 6) may all be horizontal while the machine is operating. It is desirable that the said upper edges be horizontal and disposed in a common plane, in order that the peripheral lip 83 of each cover (Fig. 3) may closely overlie the kneading plate flanges 82 all the way around the wheel, to perform the function of a guard preventing insertion of the operator's fingers or hands into the interior of the kneading wheel assembly while the machine is running. Closing of the covers or lids 18—19 may be limited by means of any suitable form of stop located at or near the hinge line thereof to preclude actual contact of the covers upon the tops of the kneading plates.

The narrower or trailing end of each kneading plate preferably is turned inwardly as at 81, Fig. 7, to provide an end nose that cooperates with the dough pocket of the next adjacent kneading plate, to substantially close the extreme end of said pocket. On each kneading plate, the pocket is indicated at 85 (Fig. 6) and is formed by recessing the working face of the plate from the leading edge 80 to a point rearwardly thereof, where the shoulder 86 forms one end of the pocket. The opposite end of the pocket, as stated previously, is furnished by the nose 81 (Fig. 7) of the next adjacent kneading plate. This relationship is common to all of the kneading plates.

It should be observed that the working outer surfaces of the assembled kneading plate structure slope inwardly and upwardly, but are not concentrically related to the cone. That is, all points on the working surfaces of the plates when in operating relationship to the cone, are at different distances from the working face of the cone, the distances becoming progressively greater in the upward direction and in the direction of the trailing ends of the plates. To state it otherwise, the slope of the working face of each plate is such that a dough lump dropped into the pocket 85 while the kneading wheel is rotating clockwise, will be grasped by shoulder 86 and rolled out of the pocket, and then advanced between the cone surface and the major surface of the plate. As the dough lump is advanced along the plate surface, pressure upon the lump is gradually relieved, since the lump will climb up the shelf surface 77 of an incline 78 toward the top edge of the plate near its trailing end, where the distance between the plate and cone is greatest. As the rotation of the kneading wheel continues, the lump will eventually reach the trailing end of the plate, from which it will tumble down by gravity into the pocket of the next adjacent kneading plate. In so tumbling the axis of the lump will change direction, and the lump will thereupon be struck by the kneading shoulder 86 of said next adjacent plate for squeezing out the excess gas preparatory to another rounding and kneading operation upon the dough lump. Very slight clearances are established between the cone and the kneading wheel edges 79, and between the inclined shelf faces 77 and the lower longitudinal edges of the kneading plates. Shredding of the dough lumps and severance of small pieces therefrom, are practically eliminated, so that the amount of scrap produced during operation of the machine is negligible.

Accurate seating of the lower longitudinal edges 84 of the kneading plates to the upper wide faces 77 of the inclines, is aided by the fact that the kneading plate saddles 60 may rock slightly about the axes of the adjusting screw shafts 56 as previously stated. The seating contact is maintained by the action of the holding means illustrated by Figs. 6, 7 and 8 hereinbefore described.

Referring to Fig. 4, the characters 89 indicate pairs of bolt holes at which the bearings 58 are fixed to the kneading wheel, whereas characters 90 indicate pairs of bolt holes at which the bearings 57 are fixed thereto. The slots or apertures 91 merely provide for droppage of any foreign substances or objects onto the disc 40, from which such substances or objects will be swept by the brush or accumulator 47.

After long usage of the machine, wear may occur between the reduced edges 79 of the kneading wheel and the working face of the cone. To compensate for such wear, means are provided for effecting a bodily vertical adjustment of the kneading wheel. Such means may be of one form or another, but by preference may comprise a thrust collar 92 (Fig. 3) keyed or splined for longitudinal sliding but non-rotative movement upon the upper end of the main shaft 27, with means for axially adjusting the shaft vertically through the collar. For this purpose, the upper end of shaft 27 may be bored and threaded to receive an adjusting screw 93 the head of which seats within an upper recess of a cap 94 that rests upon the top of the collar and is forced to rotate with the collar and shaft through the provision of a connecting pin or the like 95. The collar 92 may rotate upon ball thrust bearing means 96, supported upon the bridge piece 15, if desired. The thrust bearing carries the weight of and bodily suspends the entire kneading wheel assembly, so that bearings such as 38 and 39 may readily be serviced and replaced if necessary, without dismantling the machine. Whenever it becomes necessary to adjust the clearance between the kneading wheel edges 77 and the working inner face of the cone, it is necessary only to rotate the adjusting screw 93 in one direction or the other, for bodily elevating or lowering the main shaft 27 and the kneading wheel fixed thereto. Exceedingly close adjustment resulting in great uniformity of clearance all around the wheel, is afforded by means of the structure disclosed. The adjustment, as is obvious, may be completed in a few seconds by a mere slight rotation of the adjusting screw 93, and without danger of throwing the kneading wheel assembly out of balance.

It is to be understood that various modifications and changes in the structural details of the device may be made, within the scope of the appended claims, without departing from the spirit of the invention.

What is claimed is:

1. A kneading and rounding machine which comprises in combination, an outer cone having an inner working face, and a kneading wheel fitted within the cone, said cone and wheel being relatively rotatable one to the other, a plurality of kneading plates carried by the wheel, each including an outer working face the working faces of both the cone and the kneading plates being divergent upwardly from the interior of the cone, and means operative to bodily move the kneading plates unitarily toward and from the working face of the cone, each along a radius of the kneading wheel, for accommodating the machine to the kneading and rounding of various sizes and kinds of plastic lumps placed between the working faces aforesaid.

2. A kneading and rounding machine which comprises in combination, an outer cone having an inner working face, and a kneading wheel fitted within the cone, said cone and wheel being relatively rotatable one to the other, a plurality of kneading plates carried by the wheel, each including an outer working face, a stationary support disposed in overhanging relationship to the cone, means carried by the overhanging support for suspending the kneading wheel bodily therefrom, and means associated with said wheel suspending means for axially shifting the kneading wheel lengthwise of the cone axis.

3. A kneading and rounding machine which comprises in combination, an outer cone having an inner working face, and a kneading wheel fitted within the cone, said cone and wheel being relatively rotatable one to the other, kneading elements carried by the kneading wheel and including working faces cooperatively related to the working face of the cone, a stationary bridge piece spanning the top of the cone and overlying the kneading wheel, a cover hinged to the bridge piece permitting access to the kneading wheel and the kneading elements within the cone, said cover having a peripheral marginal portion overlying the kneading elements, and substantially horizontal top faces on all of the kneading elements substantially uniformly spaced from the marginal portion of the cover when the cover is lowered over the kneading elements.

4. A kneading and rounding machine which comprises in combination, an outer cone having an inner working face, and a kneading wheel fitted within the cone, said wheel and cone being relatively rotatable one to the other, and a plurality of kneading plates supported upon the kneading wheel, each of said plates having a working face cooperatively related to the working face of the cone, and means displaceably mounting the kneading plates upon said wheel, for bodily disposition of the plates from an operative working relationship with the cone, to an inoperative displaced position remote from the cone, for facilitating cleaning of the kneading plates.

5. A kneading and rounding machine which comprises in combination, an outer cone having an inner working face, and a kneading wheel fitted within the cone, said wheel and cone being relatively rotatable one to the other, and a plurality of kneading plates supported upon the kneading wheel, each of said plates having a working face cooperatively related to the working face of the cone, and means displaceably mounting the kneading plates upon said wheel, for bodily disposition of the plates from an operative working relationship with the cone, to an inoperative displaced position remote from the cone, for facilitating cleaning of the kneading plates, and means for varying the spacing of the plates from the cone independently of disposition of the displaceable mounting means, whereby bodily displacement and return of the kneading plates to cooperative relationship with the cone restores the original spacing between the plates and the cone as established by the means last mentioned.

6. A kneading and rounding machine comprising in combination, a pair of relatively rotatable members having working faces spaced apart for reception of plastic lumps to be kneaded and rounded, a stationary bridge piece carried by one of said members and overhanging the other of said members, an upright shaft fixed to said other member, and means for suspending the shaft from the bridge piece at various elevations beneath the bridge piece.

7. A kneading and rounding machine comprising in combination, a pair of relatively rotatable members, one of which members includes a working face, a plurality of kneading plates carried by the other member, said plates having working faces cooperative with the working face of said one member to knead and round a plastic mass, and means supporting the kneading plates on said other member for bodily displacement of the plates and their working faces from kneading and rounding proximity with the working face of said one member, and including stop means to automatically re-establish the kneading and rounding proximity positions of the plates upon return thereof from the displaced position to the cooperative position aforesaid.

8. A kneading and rounding machine comprising in combination, a pair of relatively rotatable members, one of which members includes a working face, a plurality of kneading plates carried by the other member, said plates having working faces cooperative with the working face of said one member to knead and round a plastic mass, and means supporting the kneading plates on said other member for bodily displacement of the plates and their working faces from kneading and rounding proximity with the working face of said one member, and including stop means to automatically re-establish the kneading and rounding proximity positions of the plates upon return thereof from the displaced position, and means common to the plurality of kneading plates for unitarily shifting the plates toward and from the working face of the first member, to establish at will the proximity positions aforesaid.

9. A kneading wheel assembly for a machine of the class described, comprising a wheel having a center and a periphery, a plurality of inclines at the periphery of the wheel, and a plurality of kneading plates corresponding in number to the number of inclines, said kneading plates each having a lower edge portion to rest upon an incline in upstanding relationship to the wheel, and means for adjusting the plates radially of the wheel for varying the extent to which the plates approach the wheel periphery.

10. A kneading wheel assembly for a machine of the class described, comprising a wheel having a center and a periphery, a plurality of inclines at the periphery of the wheel, and a plurality of kneading plates corresponding in number to the number of inclines, said kneading plates each having a lower edge portion to rest upon an incline in upstanding relationship to the wheel, and means common to all of the kneading plates for shifting them unitarily toward and from the periphery of the wheel.

11. A kneading wheel assembly for a machine of the class described, comprising a wheel having a center and a periphery, a plurality of inclines at the periphery of the wheel, and a plurality of kneading plates corresponding in number to the number of inclines, said kneading plates each having a lower edge portion to rest upon an incline in upstanding relationship to the wheel, and pivotal connections between the wheel and each plate whereby the plates may be swung arcuately toward the wheel axis that passes through the center of the wheel, in disassociating the kneading plate lower edges from their respective inclines.

12. A kneading wheel assembly for a machine of the class described, comprising a wheel having a center and a periphery, a plurality of kneading plates carried by the wheel, and means supporting the kneading plates for movement from operative working positions near the wheel periphery, to inoperative positions remote from the wheel periphery.

13. A kneading wheel assembly for a machine of the class described, comprising a wheel having a center and a periphery, a plurality of kneading plates carried by the wheel, and means supporting the kneading plates for movement from operative working positions near the wheel periphery, to inoperative positions remote from the wheel periphery, and means associated with the kneading plates for adjusting the plates radially of the wheel to alter the operative working positions thereof.

14. A kneading wheel assembly for a machine of the class described, comprising a substantially horizontal wheel having a center and a periphery, a plurality of kneading plate hinges carried by the wheel, a plurality of kneading plates one being associated with each hinge for vertical swinging movement of the plates arcuately toward and from the wheel axis that passes through the wheel center, and means for bodily shifting the hinges substantially horizontally toward and from the center of the wheel, to locate the kneading plates relative to the wheel periphery.

15. A kneading wheel assembly for a machine of the class described, comprising a wheel having a center and a periphery, a plurality of kneading plate hinges carried by the wheel, a plurality of kneading plates one being associated with each hinge for swinging movement of the plates arcuately toward and from the wheel axis that passes through the wheel center, and means for bodily shifting the hinges unitarily toward and from the center of the wheel, to locate the kneading plates relative to the wheel periphery, a series of inclines at the wheel periphery corresponding in number to the number of kneading plates, said inclines progressing from the mean plane of the wheel upwardly and away from said plane, and ending at substantial elevations above the plane of the wheel, said inclines each having a wide upper face with a thin outer edge, said wide upper faces providing shelves for the support of the kneading plates in all shifted positions of the kneading plates and their hinges toward and from the wheel center.

16. A kneading wheel assembly for a machine of the class described, comprising a wheel having a center and a periphery, a plurality of kneading plate hinges carried by the wheel, a plurality of kneading plates one being associated with each hinge for swinging movement of the plates arcuately toward and from the wheel axis that passes through the wheel center, and means for bodily shifting the hinges unitarily toward and from the center of the wheel, to locate the kneading plates relative to the wheel periphery, a series of inclines at the wheel periphery corresponding in number to the number of kneading plates, said inclines progressing from the mean plane of the wheel upwardly and away from said plane, and ending at substantial elevations above the plane of the wheel, said inclines each having a wide upper face with a thin outer edge, said wide upper faces providing shelves for the support of the kneading plates in all shifted positions of the kneading plates and their hinges toward and from the wheel center, and means on each kneading plate to collectively establish a substantially continuous annular upper edge located in a single plane parallel to and spaced from the mean plane of the wheel, to provide a substantially continuous joint with an overlying cover supported stationarily slightly above the kneading plates.

17. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each including a radial arm hinged to the wheel for shifting movement of the plates bodily and arcuately toward and from the main shaft, said plates each having a lower inclined edge to rest in substantial line contact upon an incline, and having working faces spaced from the working face of the cone, the plates being provided with upper faces all lying substantially in a plane spaced from and parallel to the mean plane of the wheel, and displaceable cover means supported in overlying relationship to said upper faces of the plates, in slightly spaced relationship thereto, for effecting a substantially uniformly close but running joint between the cover means and the upper faces of the plates while the wheel rotates.

18. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each including a radial arm hinged to the wheel for shifting movement of the plates bodily and arcuately toward and from the main shaft, said plates each having a lower inclined edge to rest in substantial line contact upon an incline, and having working faces spaced from the working face of the cone, and means to hold the plates selectively in the line contact position aforesaid or in the alternative shifted position remote from the inclines.

19. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each including a radial arm hinged to the wheel for shifting movement of the plates bodily and arcuately toward and from the main shaft, said plates each having a lower inclined edge to rest in substantial line contact upon an incline, and having working faces spaced from the working face of the cone, an apertured disc stationarily supported beneath the wheel and about the main shaft, and a scrap gathering member depending from the wheel in wiping contact with the disc, for delivery of scrap to the aperture of the disc.

20. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each including a radial arm hinged to the wheel for shifting movement of the plates bodily and arcuately toward and from the main shaft, said plates each having a lower inclined edge to rest in substantial line contact upon an incline, and having working faces spaced from the working face of the cone, an actuator overlying the wheel, and means associated with said actuator for moving the kneading plates unitarily toward and from the working face of the cone.

21. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each including a radial arm hinged to the wheel for shifting movement of the plates bodily and arcuately toward and from the main shaft, said plates each having a lower inclined edge to rest in substantial line contact upon an incline, and having working faces spaced from the working face of the cone, a stationary support overlying the wheel and bridging the cone diametrally, a main shaft bearing element on said support arranged to suspend the main shaft and the wheel thereon for rotation, said bearing element including means accessible above said support for adjusting the main shaft longitudinally of its axis, to vary the clearance between the working face of the cone and the outer edges of the wheel inclines.

22. In a kneading and rounding machine for individual plastic masses, the combination of a cone having an inner working face, and a cooperative disc within the cone, said cone and said disc being arranged for rotation relatively, the disc having outer margins each constituted of a series of inclines spiraling upwardly away from the plane of the disc and separated at their ends by spaces between the low level of one incline and the high level of the next adjacent incline, all around the disc in succession, a series of individual kneading plates corresponding in number to the number of inclines, each of said plates being mounted upon the disc and having a working face spaced from the working face of the cone, said plates resting upon and being each substantially coextensive with an incline and having a leading end and a trailing end, the leading end of each plate being recessed to cooperate with the working face of the cone in forming a pocket, each pocket being substantially closed at one end by the trailing end of an adjacent kneading plate, and means effecting the relative rotation aforesaid, in a direction such as to cause a plastic mass in leaving one of the pockets, to climb an incline while rolling between the cone and plate working faces and to drop by gravity from the trailing end of a plate into the next succeeding pocket of an adjacent kneading plate.

23. In a kneading and rounding machine for individual plastic masses, the combination of a cone having an inner working face, and a cooperative disc within the cone, said cone and said disc being arranged for rotation relatively, the disc having outer margins each constituted of a series of inclines spiraling upwardly away from the plane of the disc and separated at their ends by spaces between the low level of one incline and the high level of the next adjacent incline, all around the disc in succession, a series of individual kneading plates corresponding in number to the number of inclines, each of said plates being mounted upon the disc and having a working face spaced from the working face of the cone, said plates resting upon and being each substantially coextensive with an incline and having a leading end and a trailing end, the leading end of each plate being recessed to cooperate with the working face of the cone in forming a pocket, each pocket being substantially closed at one end by the trailing end of an adjacent kneading plate, and means effecting the relative rotation aforesaid, in a direction such as to cause a plastic mass in leaving one of the pockets, to climb an incline while rolling between the cone and plate working faces and to drop by gravity from the trailing end of a plate into the next succeeding pocket of an adjacent kneading plate, said inclines each having an outer spiral edge having practically a running fit upon the working face of the cone, and means for varying the distance between the working face of the cone and the working faces of the kneading plates, and correspondingly varying the width of incline exposed to the plastic mass in traveling from one kneading plate to another in succession.

24. In a kneading and rounding machine for individual plastic masses, the combination of a cone having an inner working face, and a cooperative disc within the cone, said cone and said disc being arranged for rotation relatively, the disc having outer margins each constituted of a series of inclines spiraling upwardly away from the plane of the disc and separated at their ends by spaces between the low level of one incline and the high level of the next adjacent incline, all around the disc in succession, a series of individual kneading plates corresponding in number to the number of inclines, each of said plates being mounted upon the disc and having a working face spaced from the working face of the cone, said plates resting upon and being each substantially coextensive with an incline and having a leading end and a trailing end, the leading end of each plate being recessed to cooperate with the working face of the cone in forming a pocket, each pocket being substantially closed at one end by the trailing end of an adjacent kneading plate, and means effecting the relative rotation aforesaid, in a direction such as to cause a plastic mass in leaving one of the pockets, to climb an incline while rolling between the cone and plate working faces and to drop by gravity from the trailing end of a plate into the next succeeding pocket of an adjacent kneading plate, said inclines each having an outer spiral edge having practically a running fit upon the working face of the cone, and means for varying the distance between the working face of the cone and the working faces of the kneading plates, and correspondingly varying the width of incline exposed to the plastic mass in traveling from one kneading plate to another in succession, the means last mentioned including a common actuating mechanism for unitarily shifting the kneading plates radially of the disc and laterally across the inclines thereof, toward and from the working face of the cone.

25. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each mounted upon the wheel for shifting movement of the plates bodily toward and from the main shaft, said plates each having a lower inclined edge to rest in substantial line contact upon an incline, and having working faces spaced from the working face of the cone, the plates being provided with upper faces all lying substantially in a plane spaced from and parallel to the mean plane of the wheel, and displaceable cover means supported in overlying relationship to said upper faces of the plates, in slightly spaced relationship thereto, for effecting a substantially uniformly close but running joint between the cover means and the upper faces of the plates while the wheel rotates.

26. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each mounted upon the wheel for shifting movement of the plates bodily toward and from the main shaft, said plates each having a lower inclined edge to rest in substantial line contact upon an incline, and having working faces spaced from the working face of the cone, an aperture disc stationarily supported beneath the wheel and about the main shaft, and a scrap gathering member depending from the wheel in wiping contact with the disc, for delivery of scrap to the aperture of the disc.

27. In a rounder, the combination of a stationary cone having an inner annular working face sloping upwardly and outwardly, and means at the center of the cone for rotatably supporting a main shaft, a wheel centrally supported upon the main shaft, substantially within the limits of the cone, a series of inclines at the outer edge of the wheel advancing spirally upwardly and having outer edges fitted close to the working face of the cone to support and elevate plastic masses moving along the inclines as the wheel is rotated, a series of kneading plates each mounted upon the wheel for shifting movement of the plates bodily toward and from the main shaft, said plates each having a lower inclined edge to rest in substantial line contact upon an incline, and having working faces spaced from the working face of the cone, a stationary support overlying the wheel and bridging the cone diametrally, a main shaft bearing element on said support arranged to suspend the main shaft and the wheel thereon for rotation, said bearing element including means accessible above said support for adjusting the main shaft longitudinally of its axis, to vary the clearance between the working face of the cone and the outer edges of the wheel inclines.

28. A kneading and rounding machine which comprises in combination, an outer cone having an inner working face, and a kneading wheel fitted within the cone, said cone and wheel being relatively rotatable one to the other, a plurality of kneading plates carried by the wheel, each including an outer working face, a stationary support disposed in overhanging relationship to the cone, means carried by the overhanging support for suspending the kneading wheel bodily therefrom, means associated with said wheel suspending means for axially shifting the kneading wheel lengthwise of the cone axis, a duster driving shaft rotatably mounted upon the stationary support, and power transmission means associated with the wheel suspending means and said duster driving shaft, for actuating a duster supported upon the machine.

29. A kneading wheel assembly for a machine of the class described, comprising a substantially horizontal wheel having a center and a periphery, a plurality of kneading plate hinges carried by the wheel, a plurality of kneading plates one being associated with each hinge for vertical swinging movement of the plates arcuately toward and from the wheel axis that passes through the wheel center, and means for bodily shifting the hinges with their associated kneading plates unitarily toward and from the center of the wheel, to locate the kneading plates relative to the wheel periphery.

30. In a machine of the class described, the combination which comprises, a frame including a stationary kneading member, and a cooperative rotational kneading member for working and shaping a plastic mass placed between said members, an upright shaft supporting the rotational kneading member, said shaft having an upper end and a lower end extending respectively, above and below the rotational kneading member, a stationary support disposed in overhanging relationship to the rotational kneading member, and means on the support for suspending the shaft bodily by its upper end, shaft bearing means on the frame for laterally supporting the lower end of the shaft beneath the kneading member thereon, said shaft bearing means being bodily displaceable downwardly along and off the lower end of the shaft while the upper end of the shaft is held suspended from the stationary overhanging support.

31. In a machine of the class described, the combination which comprises, a frame including a stationary kneading member, and a cooperative rotational kneading member for working and shaping a plastic mass placed between said members, an upright shaft supporting the rotational kneading member, said shaft having an upper end and a lower end extending respectively, above and below the rotational kneading member, a stationary support disposed in overhanging relationship to the rotational kneading member, and means on the support for suspending the shaft bodily by its upper end, shaft bearing means on the frame for laterally supporting the lower end of the shaft beneath the kneading member thereon, said shaft bearing means being bodily displaceable downwardly along and off the lower end of the shaft while the upper end of the shaft is held suspended from the stationary overhanging support, and means at the point of suspension of the shaft, for limited adjustment of the shaft vertically to dispose of the rotational kneading member at different elevations relative to the stationary kneading member.

32. In a machine of the class described, the combination which comprises, a frame including a stationary kneading member, and a cooperative rotational kneading member for working and shaping a plastic mass placed between said members, an upright shaft supporting the rational kneading member, said shaft having an upper end and a lower end extending respectively, above and below the rotational kneading member, a stationary support disposed in overhanging relationship to the rotational kneading member, and means on the support for suspending the shaft bodily by its upper end, shaft bearing means on the frame for laterally supporting the lower end of the shaft beneath the kneading member thereon, said shaft bearing means being bodily displaceable downwardly along and off the lower end of the shaft while the upper end of the shaft is held suspended from the stationary overhanging support, and means accessible above the stationary overhanging support, for shifting the shaft lengthwise to dispose the rotational kneading member thereof to different elevations relative to the stationary kneading member.

33. In a dough working machine of the class described, the combination which comprises, a frame including a stationary kneading member, and a cooperative kneading member for working and shaping a plastic mass placed between said members, an upright rotational shaft supporting the rotational kneading member, said shaft having an upper end and a lower end, the upper end extending above the rotational kneading member supported on the shaft, shaft bearing means on the frame providing lateral support for the shaft, and means on the overhanging support for rotationally suspending the shaft by its upper end.

34. In a dough working machine of the class described, the combination which comprises, a frame including a stationary kneading member, and a cooperative kneading member for working and shaping a plastic mass placed between said members, an upright rotational shaft supporting the rotational kneading member, said shaft having an upper end and a lower end, the upper end extending above the rotational kneading member supported on the shaft, shaft bearing means on the frame providing lateral support for the shaft, and means on the overhanging support for rotationally suspending the shaft by its upper end, and including a member for axially shifting the shaft and adjusting the kneading members relatively to one another.

SIGMUND SCHIFF.